United States Patent [19]

Yuhara et al.

[11] Patent Number: 5,671,316

[45] Date of Patent: Sep. 23, 1997

[54] CONNECTING STRUCTURE OF OPTICAL FIBER TO OPTICAL WAVEGUIDE

[75] Inventors: Toshiya Yuhara; Hisao Iitsuka; Kazuyuki Fukuda; Makoto Shimaoka; Tetsuo Kumazawa, all of Ibaraki, Japan

[73] Assignee: Hitachi Cable, Ltd., Tokyo, Japan

[21] Appl. No.: 601,657

[22] Filed: Feb. 14, 1996

[30] Foreign Application Priority Data

Feb. 14, 1995 [JP] Japan ................................. 7-025633

[51] Int. Cl.⁶ .............................................. G02B 6/00
[52] U.S. Cl. ........................... 385/137; 385/11; 385/49; 385/50; 385/76; 385/77
[58] Field of Search ........................... 385/14, 15, 11, 385/49, 50, 51, 52, 53, 58, 59, 60, 71, 72, 76, 77, 78, 83, 84, 66, 136, 139, 147, 137, 132

[56] References Cited

U.S. PATENT DOCUMENTS

| 4,589,728 | 5/1986 | Dyott et al. ......................... 385/11 X |
| 4,762,387 | 8/1988 | Batdorf et al. ...................... 385/11 X |
| 4,919,509 | 4/1990 | Miller et al. ........................ 385/55 X |
| 5,016,970 | 5/1991 | Nagase et al. ...................... 385/78 X |
| 5,216,733 | 6/1993 | Nagase et al. ...................... 385/60 |
| 5,513,295 | 4/1996 | Go .................................... 385/137 |

FOREIGN PATENT DOCUMENTS 1-302211   5/1988   Japan ............................. 385/137 X

OTHER PUBLICATIONS

"Integrated Optics: A Practical Solution for the Fiber–Optic Gyroscope", H.C. Lefevre et al., Fiber Optics Gyros, 10th Anniversary COnference, vol. 719 (1986), pp. 101–111.

Primary Examiner—Brian Healy
Attorney, Agent, or Firm—Lowe, Price, LeBlanc & Becker

[57] ABSTRACT

A connecting structure of an optical fiber to an optical waveguide includes a circular cylindrical holder having a bore with a circular cross-section communicating one end thereof to the other. The protecting layer removal end of the optical fiber is inserted into the bore. An end plane of the protecting layer removal end and a side plane of the holder are co-planar to be connected to an end surface of an optical waveguide.

21 Claims, 5 Drawing Sheets

CONNECTING STRUCTURE OF OPTICAL FIBER TO OPTICAL WAVEGUIDE

BACKGROUND OF THE INVENTION

This invention relates to a connecting structure of an optical fiber to an optical waveguide, and more particularly to, a connecting structure of an polarization-maintaining optical fiber to an optical waveguide, which is suitable for optical systems such as optical fiber gyroscopes, optical modulators and optical switches.

A conventional connecting structure of an optical fiber to an optical waveguide comprises an optical fiber with a protecting layer removal end and a holder for holding the protecting layer removal end of the optical fiber, wherein the holder is provided with a V-shaped groove or a rectangular groove for positioning the protecting layer removal end to be adhered with low hardness setting resin to an inner wall of the groove.

In the conventional connecting structure of an optical fiber to an optical waveguide, however, there is a disadvantage in that a non-uniform stress is given around the protecting layer removal end of the optical fiber by the setting resin, because the cross-sectional shape of the protecting layer removal end of the optical fiber differs from the cross-sectional shape of the groove, thereby resulting in a deterioration of the polarization crosstalk characteristics of the optical fiber, or producing birefringence at the connecting portion of the optical fiber when the fiber is made of plastics. Another disadvantage is that connecting loss of the optical fiber and the optical waveguide is changed by the variation of temperature, because the fiber easily moves inside the groove filled with the low hardness setting resin.

SUMMARY OF THE INVENTION

Accordingly, it is an object of the invention to provide a connecting structure of an optical fiber to an optical waveguide by which the deterioration of polarization crosstalk characteristics of the optical fiber can be suppressed when a polarization-maintaining optical fiber is used.

It is a further object of the invention to provide a connecting structure of an optical fiber to an optical waveguide by which a variation of connecting loss thereof can be suppressed as well as a reliability of that structure can be improved.

It is a still further object of the invention to provide a connecting structure of an optical fiber to an optical waveguide by which a generation of birefringence at the connecting portion of a optical fiber can be suppressed when a plastic optical fiber is used.

According to the first feature of the invention, a connecting structure of an optical fiber to an optical waveguide, comprises:

an optical fiber having a protecting layer removal end connected to the optical waveguide; and a holder for holding the protecting layer removal end of the optical fiber;

wherein the holder is provided with a bore of circular cross-section for receiving the protecting layer removal end therein, whereby an end plane of the protecting layer removal end and a side plane of the holder are co-planar.

According to the second feature of the invention, a connecting structure of an optical fiber to an optical waveguide, comprises:

a polarization-maintaining optical fiber having a protecting layer removal end; and a holder for holding the protecting layer removal end of the optical fiber;

wherein the holder is provided with a bore with a circular cross-section for positioning the protecting layer removal end therein, whereby an end plane of the protecting layer removal end and a side plane of the holder are co-planar, and a direction of one of the birefringence axes of the optical fiber is parallel to the side plane of the holder.

BRIEF DESCRIPTION OF THE DRAWINGS

The invention will be explained in more detailed in conjunction with the appended drawings, wherein.

DESCRIPTION OF THE PREFERRED EMBODIMENTS

Before explaining a connecting structure of an optical fiber to an optical waveguide in the first preferred embodiment, the aforementioned conventional connecting structures will be explained in FIGS. 1 and 2.

Figure 1:
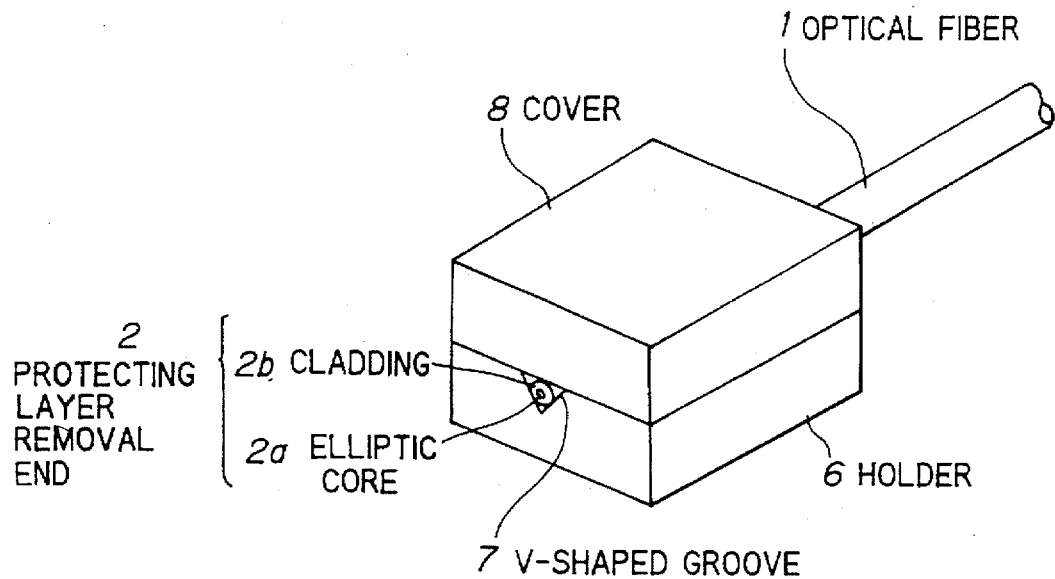
FIGS. 1 and 2 are perspective views showing first and second conventional connecting structures of optical fibers to an optical waveguides.

FIG. 1 shows the first conventional connecting structure of an optical fiber to an optical waveguide which comprises an elliptic core type polarization-maintaining optical fiber 1 having a elliptic core 2a and a cladding 2b, a protecting layer of which is removed at an end to provide a protecting layer removal end 2, a holder 6 having a V-shaped groove 7 for positioning the protecting layer removal end 2 of the optical fiber 1 along the groove 7, and a cover 8 for covering the protecting layer removal end 2 and the groove 7, wherein a clearance between the V-shaped groove 7 and the protecting layer removal end 2 is filled with resin (not shown). Then the protecting layer removal end 2 is set in the groove 7, the end of which is connected to an end surface of an optical waveguide (not shown).

Figure 2:
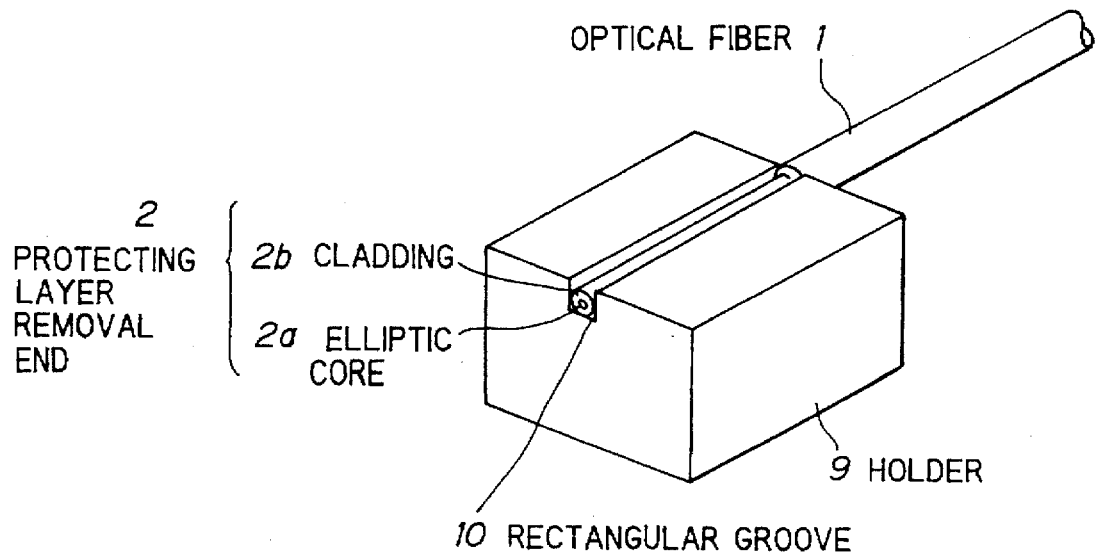

FIG. 2 shows the second conventional connecting structure of an optical fiber to an optical waveguide which comprises the same elliptic core type polarization-maintaining optical fiber 1 as the first one, a holder 9 having a rectangular groove 10 for positioning the protecting layer removal end 2 of the optical fiber 1 along the groove 10, and a resin (not shown) to set the protecting layer removal end 2 in the groove 10.

In the conventional connecting structure, the cross-sectional shape of the protecting layer removal end 2 differs from the cross-sectional shape of the groove 7, 10. As a result, the disadvantage, as described before, in which a non-uniform stress is given around the protecting layer removal end 2 by the contraction of the setting resin to deteriorate the polarization crosstalk characteristics of the optical fiber 1, is observed. In the conventional structure, for example, wherein an elliptic core type polarization-maintaining fiber having a polarization crosstalk of −35 dB and a resin having a Shore-D hardness of 83 degrees after setting are used, the polarization crosstalk is deteriorated up to −3 dB after the resin is set. In order to suppress that deterioration, when a resin having a low Shore-D hardness of 45 degrees after the setting is used, the polarized light cross-talk can be lowered below −15 dB within temperature range of −30° to 80° C. A variation of connecting loss of the optical fiber to an optical waveguide relative to temperature within that temperature range, however, will increase up to 2 dB, because the optical fiber easily moves inside the groove 7, or 10. As a result, the reliability thereof is lowered.

Therefore, it is difficult for the conventional connecting structures to suppress the variation of connecting loss as well as to suppress the deterioration of polarization crosstalk.

Next, a connecting structure of an optical fiber to an optical waveguide in the first preferred embodiment will be explained in FIG. 3, wherein like parts are indicated by like reference numerals as used in FIGS. 1 and 2.

In the first preferred embodiment, a cylindrical holder 3 having a length of about 5 mm is provided with a bore 4 of circular cross-section on a central axis thereof. The inside diameter of the bore 4 is 10 μm larger than the outside diameter of the protecting layer removal end 2 of the silica glass optical fiber 1. The protecting layer removal end 2 is inserted into the bore 4, where a clearance of the bore 4 and the protecting layer removal end 2 is filled with a UV-setting resin having a Shore-D hardness of 83 degrees after the setting thereof (not shown). After setting the resin, protecting layer removal end 2 and the holder 3 are ground and polished, to be co-planar by the end plane of the protecting layer removal end 2 and the side plane 3a of the holder 3.

The difference between the inside diameter of the bore 4 and the outside diameter of the protecting layer removal end 2 is so small as about 10 μm, so that the protecting layer removal end 2 is substantially set in the middle of the bore 4, and the bore 4 of circular cross-section can make the stress caused by the contraction of the resin around the removal end 2 equalized, even if the resin has a high degree of Shore-D hardness. As a result, the deterioration of polarization crosstalk is suppressed, and the temperature-dependent variation of insertion loss becomes smaller because the optical fiber hardly moves inside the bore 4 by the harder setting resin.

An optical waveguide device pigtailed with polarization-maintaining optical fibers using the first preferred embodiment will be explained in FIGS. 4 and 5. A Y-shaped splitting/combining optical waveguide 13 and straight optical waveguides 14, 15a, and 15b are formed on the surface of a lithium niobate (LiNbO₃) substrate, where the surface is parallel to the X-plane. Those optical waveguides are produced by titanium (Ti) diffusion method so as to make the direction of propagating light in each waveguide coincide with y-axis of the substrate 12. Both sides of the substrate 12, on which the end surfaces of each straight optical waveguide 14, 15a, and 15b are exposed, are inclined by 10° against normal of the direction of propagating light in each waveguide. As a result, a coupling of Fresnel reflections at the end surface of each straight optical waveguide 14, 15a, and 15b with a waveguide mode propagating through each waveguide can be avoided.

Figure 4:
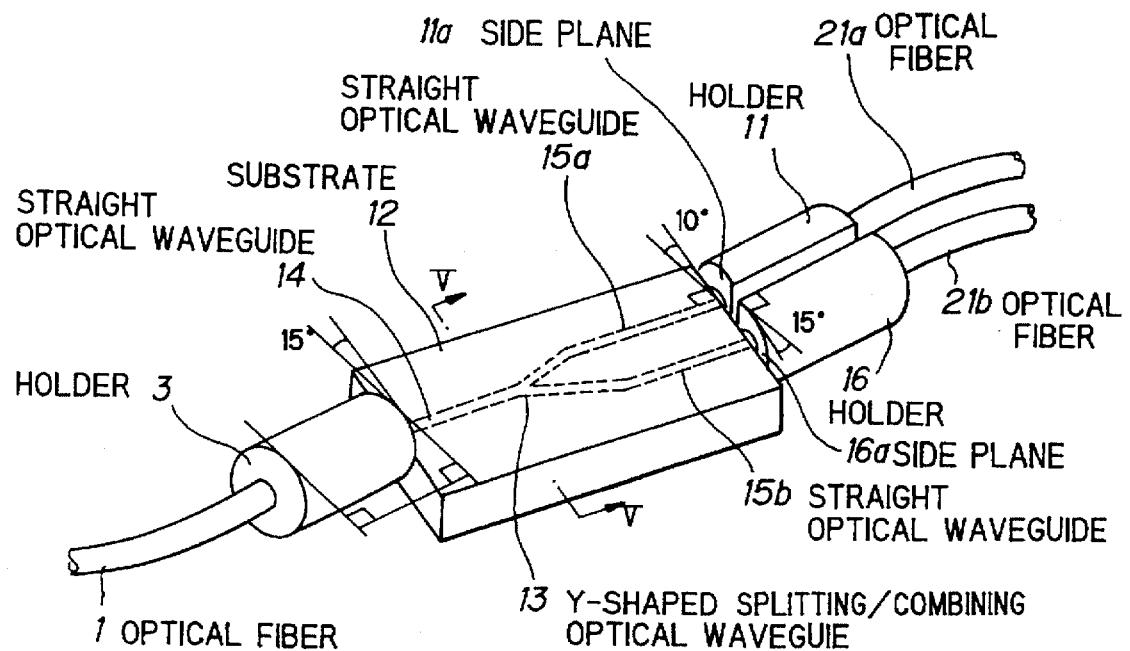
FIG. 4 is a perspective view showing an optical waveguide device pigtailed with polarization-maintaining optical fibers using the first preferred embodiment shown in FIG. 3.
Figure 5:
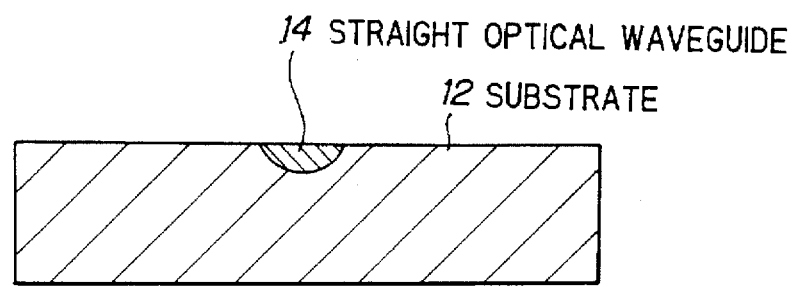
FIG. 5 is a cross-sectional view taken along the line V—V in FIG. 4.

As shown in FIG. 4, the elliptic core type polarization-maintaining optical fiber 1 being inserted in the holder 3 is optically connected to the straight optical waveguide 14 at the one side of the substrate 12 (one-port side), wherein the end surface of the straight optical waveguide 14 is exposed and connected to the end surface of the optical fiber 1. In this case, the end surface of the optical fiber 1 and the side plane of the holder 3 provide a co-planarity which is inclined by 15° against normal of the direction of propagating light in the optical fiber 1, and to which a direction of short axis of the elliptic core of the optical fiber 1 is parallel. For this structure, it is possible to satisfy the Snell's law and to propagate the light optically straight from the optical fiber 1 to the straight waveguide 14 or backward at the interface thereof.

In the same manner as in the optical fiber 1, the elliptic core type polarization-maintaining optical fibers 21a, 21b being inserted in the holders 11, and 16 respectively are optically connected to the straight optical waveguides 15a, and 15b at the other side of the substrate 12 (two-port side). The end planes of the straight optical waveguides 15a, and 15b are exposed to be connected to the end planes of the optical fibers 21a, and 21b, so that the end planes of the optical fibers 21a, and 21b and the side planes of the holders 11, and 16 provide a co-planarity, which is inclined by 15° against normal of the direction of propagating light in the optical fibers 21a, and 21b, and to which a direction of short axes of the elliptic cores of each optical fiber 21a, and 21b is parallel. Especially in this case, as shown in FIG. 6 to be explained in more detail later, both holders 11, and 16 have flat surfaces defined by being partially cut longitudinally on the side to form a semicircular cylinder, and they are positioned in parallel to make both of the flat surfaces of the holder 11, and 16 opposed.

An elliptic core type polarization-maintaining optical fiber has two birefringent main axes, and each axis coincides with a long axis and a short axis of the elliptic core. On the other hand, each optical waveguide produced on the X-plane of a lithium niobate substrate has two birefringent main axes, which are orthogonal to the direction of propagating light, and one of the two birefringent main axes is parallel to a main plane of the substrate, the other is parallel to a thickness direction thereof. If the polarization-maintaining optical fiber is opposed to the optical waveguide directly to make the short axis of the elliptic core parallel to the thickness direction of the optical waveguide at the interface thereof, a polarization of linearly polarized light traveling through the connecting structure will be maintained.

Therefore, in the optical waveguide device shown in FIG. 4, it is preferable that the polarization-maintaining optical fibers 1, 21a, and 21b are connected to the ends of optical waveguides 14, 15a, and 15b, to make the short axis of the elliptic core 2a parallel to the thickness direction of the optical waveguides 14, 15a, and 15b. To ensure this connection and make it easier, it is preferable that the inclined side planes 3a, 11a, and 16a of the holders 3, 11, and 16 are formed to make the direction of short axes of optical fiber 1, 21a, and 21b parallel to the inclined plane.

Figure 6:
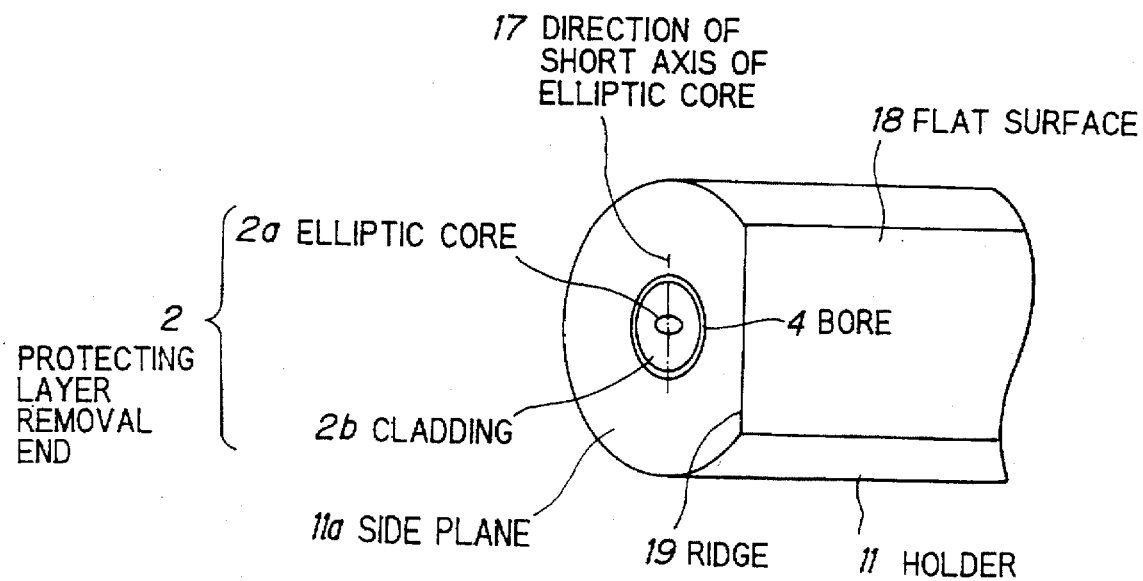
FIG. 6 is a perspective view showing a connecting structure of an optical fiber to an optical waveguide in a second preferred embodiment according to the invention.

FIG. 6 shows a connecting structure of an elliptic core type polarization-maintaining optical fiber to an optical waveguide in the second preferred embodiment in the invention. Especially in this case, the protecting layer removal end 2 of the optical fiber 2 is inserted into the bore 4 of the holder 11 to be held therein by a resin (not shown), so that the direction 17 of the short axis of the elliptic core 2a is parallel to a flat surface 18. Then the direction 17 of the short axis of the elliptic core 2a is made parallel to the thickness direction of the straight optical waveguide 15a by positioning the holder 11 at two-port side by making a ridge 19 of the holder 11 parallel to a side of the substrate 12 where the end surfaces of optical waveguides is not exposed as shown in FIG. 4.

Figure 7:
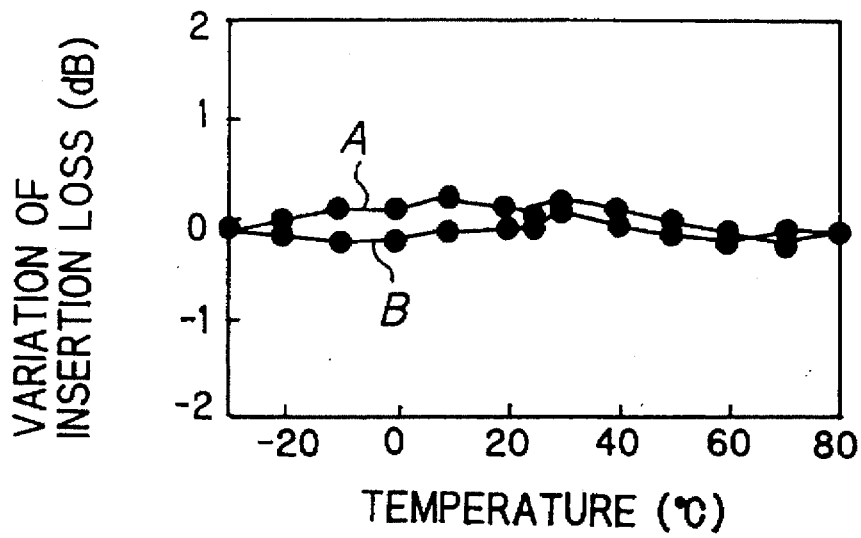
FIG. 7 is a graph showing a variation of insertion loss relative to temperature of the optical waveguide device shown in FIG. 4.
Figure 8:
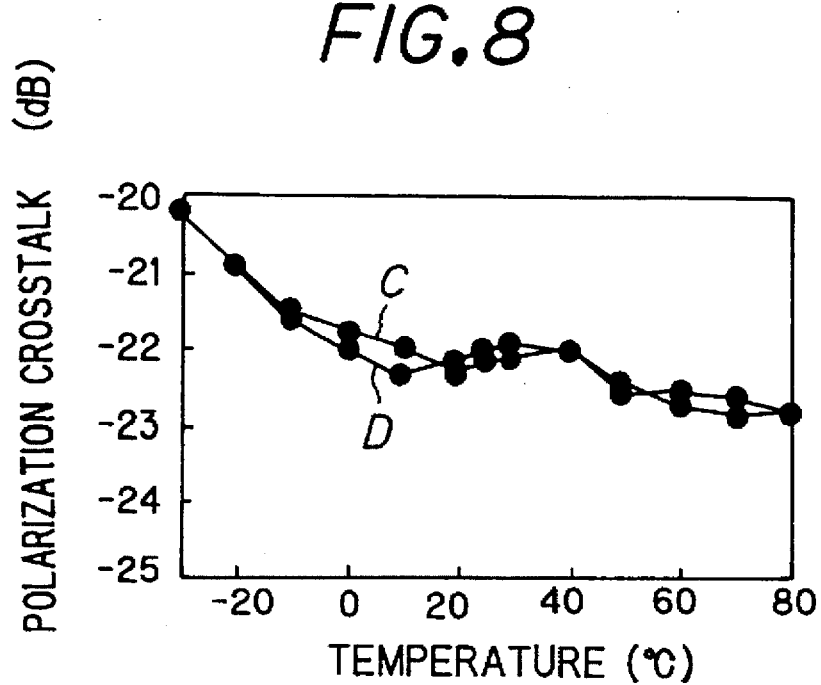
FIG. 8 is a graph showing a variation of polarization crosstalk relative to temperature of the optical waveguide device shown in FIG. 4.

FIG. 7 shows a variation of insertion loss relative to temperature of the optical waveguide device shown in FIG. 4, and FIG. 8 shows a variation of polarization crosstalk relative to temperature of the same device. The curves A and C are obtained by increasing the temperature, and the curves B and D are obtained by decreasing the temperature, respectively, within the range of −30° to 80° C. The results show that the insertion loss variation range is below 0.5 dB and the polarization crosstalk is below −20 dB. This indicates that the waveguide device has a more improved performance than a device having the conventional connecting structure as shown in FIG. 1 or FIG. 2.

Figure 3:
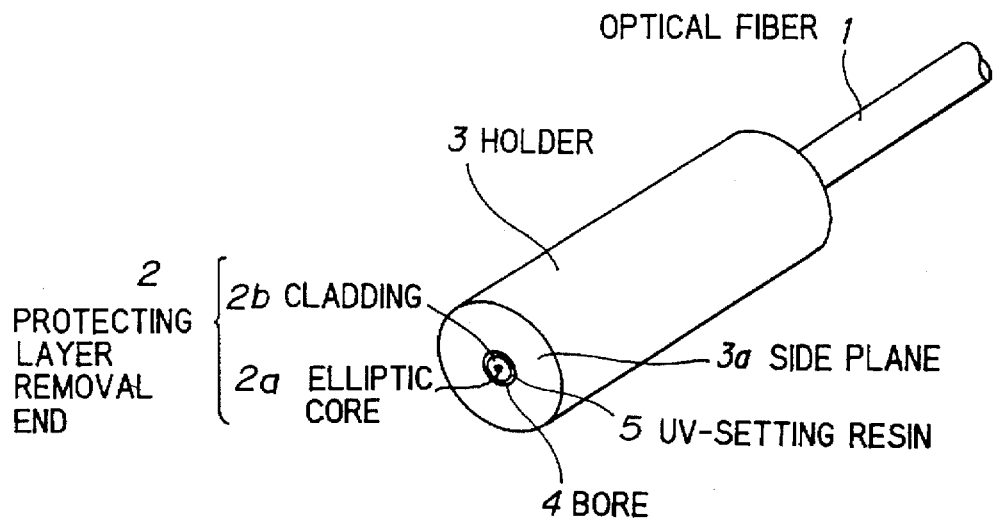
FIG. 3 is a perspective view showing a connecting structure of an optical fiber to an optical waveguide in a first preferred embodiment according to the invention.
Figure 9:
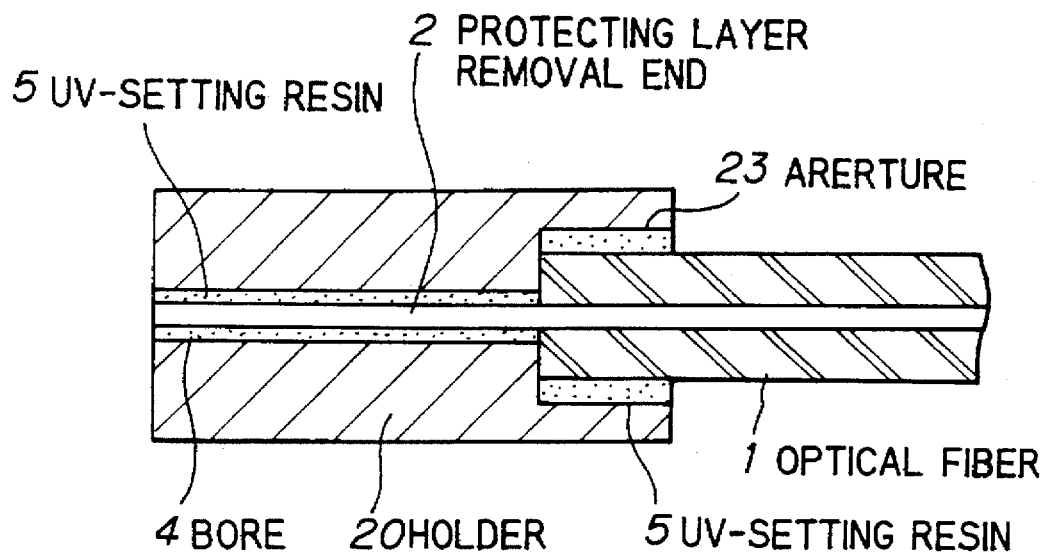
FIG. 9 is a cross-sectional view of a connecting structure of an optical fiber to an optical waveguide in a third preferred embodiment according to the invention.
Figure 10:
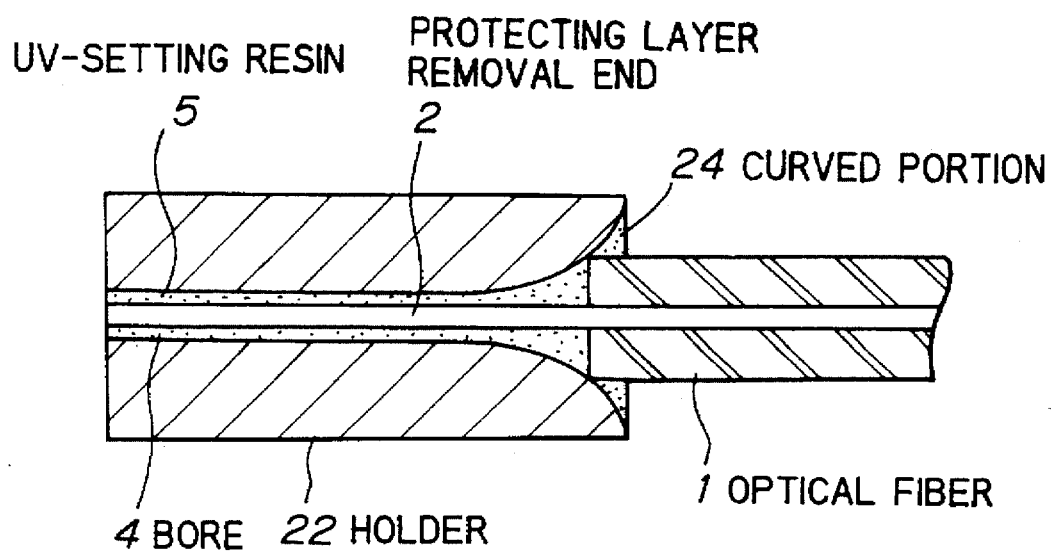
FIG. 10 is a cross-sectional view of a connecting structure of an optical fiber to an optical waveguide in a fourth preferred embodiment according to the invention.

FIGS. 9 and 10 show a connecting structure of an optical fiber to an optical waveguide in the third and fourth preferred embodiments according to the invention, respectively, wherein like parts are indicated by like reference numerals as used in FIGS. 3 and 6. In the third preferred embodiment, a cylindrical holder 20 is provided with a bore 4, the inside diameter of which is not more than 10 μm to be larger than the outside diameter of the protecting layer removal end 2 of the optical fiber 1, and an aperture 23, the inside diameter of which is larger than the outside diameter of the optical fiber 1 (i.e. protecting layer). The protecting layer removal end 2 and the end portion of the protecting layer are inserted into the bore 4 and the aperture 23, respectively, and a clearance of the bore 4, the aperture 23, the protecting layer removal end 2 and the optical fiber 1 (i.e. protecting layer) is filled with UV-setting resin 5. In the fourth preferred embodiment, instead of having the aperture 23 in the third preferred embodiment, a holder 22 is provided with a curved portion 24 having a diameter lager than that of the optical fiber 1 at the input end for receiving the end portion of the optical fiber 1. After setting the protecting layer removal end 2 and the optical fiber 1 inside the holder 20 or 22, they are ground and polished to form the co-planarity at the respective end planes.

In the above preferred embodiments, in setting the optical fiber inside the bore and connecting the end surface of the optical fiber to that of the optical waveguide, a UV-setting resin having a refractive index approximately equal to that of the optical fiber is used. The inside diameter of the bore is not more than 10 μm to be larger than the outside diameter of the protecting layer removal end, the bore is preferably at least 100 μm long to hold the protecting layer removal end stably.

Preferably, the material which may be used as the substrate includes ferro electrics such as lithium tantalate (LiTaO₃) and glass elemental semiconductors such as Si and Ge, compound semiconductors such as GaAs and InP, and polymers.

It is preferable that the material as the holders may have a linear expansion coefficient value within the range between maximum and minimum values among silica glass, resin and the substrate, which is in general $0.4 \times 10^{-6}$ to $300 \times 10^{-6}/°C$., if the silica glass optical fiber is used. That may include multicomponent glass or plastic other than silica glass.

On top of that, the material as the holder may have an absorption coefficient below 1000 $m^{-1}$ against ultraviolet rays having wavelength range effective to set the resin. For instance, when the ultraviolet rays travel through the material having an absorption coefficient of 500 $m^{-1}$ by 1 cm (0.01 m), power is lowered at the level of $e^{-500 \times 0.01} = 0.0067$, i.e. about one one hundred and fiftyth (1/150), and it takes quite a long time to set the resin. When a preferred material as described above is used, the setting time can be shortened.

Semicircular cylinders, polygonal cylinders such as triangle pole or square pole, or cylinders having an eccentric bore at the top are useful as the holders. In this case, two optical fibers may be connected to two neighboring waveguides on the two port side of the substrate without a limitation of the size of the holders.

Other types of birefringence optical fibers such as an elliptic jacket type polarization-maintaining optical fiber and so called PANDA type polarization-maintaining optical fiber may be used instead of an elliptic core type polarization-maintaining optical fiber. If a plastic fiber, which is likely to present birefringence at the connecting portion of the fiber though, is used in the present invention, generation of such birefringence can be avoided effectively.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical fiber connecting structure for an end plane of an optical fiber, said optical fiber connecting structure, comprising:

an optical fiber having a protecting layer thereon, a predetermined length of said protecting layer being removed in the vicinity of said end plane of said optical fiber to form a protecting layer removal end; and a holder for holding said protecting layer removal end, said holder being provided with a bore of circular cross-section for receiving said protecting layer removal end from one side plane of said holder to another;

wherein said another side plane of said holder is co-planar with said end plane of said optical fiber.

2. An optical fiber connecting structure for an end plane of an optical fiber according to claim 1, wherein:

said optical fiber is a polarization-maintaining optical fiber.

3. An optical fiber connecting structure for an end plane of an optical fiber, according to claim 1, wherein:

said holder has a shape of a circular cylinder or a polygonal cylinder such as a triangle pole and a square pole.

4. An optical fiber connecting structure for an end plane of an optical fiber to an optical waveguide, according to claim 1, wherein:

said holder is longitudinally provided with a flat side surface.

5. An optical fiber connecting structure for an end plane of an optical fiber to an optical waveguide, according to claim 1, wherein:

said bore has a diameter of not more than 10 μm to be larger than an outside diameter of said protecting layer removal end, said protecting layer removal end being at least 100 μm long.

6. An optical fiber connecting structure for an end plane of an optical fiber according to claim 1, wherein:

said bore is provided with an aperture for holding an end portion of said optical fiber on said one side plane of said holder, an inside diameter of said aperture or a diameter of an inscribed circle of is said aperture being larger than an outside diameter of said optical fiber.

7. An optical fiber connecting structure for an end plane of an optical fiber, according to claim 1, wherein:

said bore is provided with a curved portion for holding an end portion of said optical fiber on said one side plane of said holder, an inside diameter of said curved portion or a diameter of an inscribed circle of said curved portion on said one side plane being larger than an outside diameter of said optical fiber.

8. An optical fiber connecting structure for an end plane of an optical fiber, according to claim 1, wherein:

said optical fiber is held inside said bore by a resin having a Shore-D hardness of more than 45 degrees after setting.

9. An optical fiber connecting structure for an end plane of an optical fiber, according to claim 8, wherein:

said resin is a UV-setting resin.

10. An optical fiber connecting structure for an end plane of an optical fiber, according to claim 9, wherein:

said holder has an absorption coefficient below 1000 m$^{-1}$ against ultraviolet rays having a wavelength range effective to set said resin.

11. An optical fiber connecting structure for an end plane of an optical fiber, according to claim 1, wherein:

said holder is made from a material having a linear expansion coefficient value within the range between $0.4 \times 10^{-6}$/°C. and $300 \times 10^{-6}$/°C.

12. An optical fiber connecting structure for an end plane of an optical fiber, comprising:

a polarization-maintaining optical fiber having a protecting layer thereon, a predetermined length of said protecting layer being removed in the vicinity of said end plane of said optical fiber to form a protecting layer removal end; and a holder for holding said protecting layer removal end, said holder being provided with a bore of circular cross-section for receiving said protecting layer removal end from one side plane of said holder to another;

wherein said another side plane of said holder is co-planar with said end plane of said optical fiber, such that a direction of one of the birefringence axes of said optical fiber is parallel to said side plane of said holder.

13. An optical fiber connecting structure for an end plane of an optical fiber, according to claim 12, wherein:

said another side plane of said holder is inclined against the normal of a direction of propagating light in said optical fiber.

14. An optical fiber connecting structure for an end plane of an optical fiber, according to claim 12, wherein:

said another side plane of said holder is positioned on a side of a substrate on or in which an optical waveguide is produced so that said direction of one of the birefringence axes is parallel to a thickness direction of said optical waveguide.

15. An optical fiber connecting structure for an end plane of an optical fiber, according to claim 12, wherein:

said holder is provided with a flat surface being partially cut longitudinally on the side, and a direction of one of the birefringence axes on said optical fiber is parallel to said flat surface.

16. An optical fiber connecting structure for an end plane of an optical fiber, according to claim 15, wherein:

a pair of said holders are positioned to make both of said flat surfaces opposed in parallel, whereby a pair of said optical fibers may be optically connected to a pair of optical waveguides at a side of a substrate on or in which said optical waveguides are produced.

17. An optical fiber connecting structure for an end plane of an optical fiber, according to claim 12, wherein:

said holder has a shape of a circular cylinder or a polygonal cylinder such as a triangle pole and a square pole, wherein said bore is provided with eccentric position at least at said another side plane of said holder.

18. An optical fiber connecting structure for an end plane of an optical fiber, according to claim 12, wherein:

said optical fiber is held inside said bore by a UV-setting resin having a Shore-D hardness of more than 45 degrees after setting.

19. An optical fiber connecting structure for an end plane of an optical fiber, according to claim 18, wherein:

said holder has an absorption coefficient below 1000 m$^{-1}$ against ultraviolet rays having a wavelength range effective to set said resin.

20. An optical fiber connecting structure for an end plane of an optical fiber, according to claim 12, wherein:

said holder is made from a material having a linear expansion coefficient value with the range between $0.4 \times 10^{-6}$/°C. and $300 \times 10^{-6}$/°C.

21. An optical fiber connecting structure for an end plane of an optical fiber, according to claim 12, wherein:

said bore has a diameter of not more than 10 μm to be larger than an outside diameter of said protecting layer removal end, said protecting layer removal end being at least 100 μm long.

* * * * *